US012769579B2

(12) United States Patent
Helpa et al.

(10) Patent No.: US 12,769,579 B2
(45) Date of Patent: Oct. 20, 2026

(54) COMPUTER SYSTEM AND METHOD FOR EXECUTING AN AUTOMOTIVE CUSTOMER FUNCTION

(71) Applicant: TTTech Auto AG, Vienna (AT)

(72) Inventors: Christopher Helpa, Vienna (AT); Bernhard Leiner, Vienna (AT)

(73) Assignee: TrustMotion Austria GmbH, Vienna (AT)

( * ) Notice: Subject to any disclaimer, the term of this patent is extended or adjusted under 35 U.S.C. 154(b) by 517 days.

(21) Appl. No.: 18/211,902

(22) Filed: Jun. 20, 2023

(65) Prior Publication Data

US 2023/0418658 A1 Dec. 28, 2023

(30) Foreign Application Priority Data

Jun. 22, 2022 (EP) .................................... 22180527

(51) Int. Cl.

*G06F 9/48* (2006.01)
*G06F 9/455* (2018.01)
*G06F 9/50* (2006.01)

(52) U.S. Cl.

CPC ........ *G06F 9/4818* (2013.01); *G06F 9/45558* (2013.01); *G06F 9/4881* (2013.01); *G06F 9/5027* (2013.01); *G06F 9/5077* (2013.01)

(58) Field of Classification Search

CPC .... G06F 9/4818; G06F 9/5077; G06F 9/5027; G06F 9/45558; G06F 9/4881

See application file for complete search history.

(56) References Cited

U.S. PATENT DOCUMENTS

| | | | | |
|---|---|---|---|---|
| 10,432,552 | B2 * | 10/2019 | Zhang | G06F 9/5038 |
| 11,635,980 | B2 * | 4/2023 | Nixon | G06F 9/505 718/105 |
| 2019/0007280 | A1 * | 1/2019 | Sarangam | H04L 41/0894 |
| 2019/0379579 | A1 * | 12/2019 | Mishra | H04L 67/51 |
| 2021/0103477 | A1 * | 4/2021 | Mcclymont | G06F 21/629 |

(Continued)

OTHER PUBLICATIONS

"What is a Firewall? Types of Firewalls and How they Work". Available at https://www.fortinet.com/resources/cyberglossary/firewall. Available on Oct. 31, 2020 (Year: 2020).*

(Continued)

*Primary Examiner* — Michael W Ayers

(57) ABSTRACT

A customer function on a computer system comprising processing cores. The customer function comprises applications with a multitude of different tasks. The computer system provides containers and is configured to activate and de-activate said containers so that a container is active or inactive, wherein all tasks of the applications are assigned to containers, wherein all tasks of each specific application are assigned to exactly one specific container, wherein in a timeframe, during which a container is active, one or more cores of the computer system are exclusively reserved for the execution of the tasks of the application of said container, and wherein the computer system is configured such that when a container is inactive, the tasks of said container cannot be executed on the computer system. For each container a task sequencer is provided.

36 Claims, 12 Drawing Sheets

(56) References Cited

U.S. PATENT DOCUMENTS

| | | | | |
|---|---|---|---|---|
| 2021/0141623 A1* | 5/2021 | Bequet | G06F 9/546 | |
| 2023/0091346 A1* | 3/2023 | Furuichi | G05D 1/0011 | 701/2 |

OTHER PUBLICATIONS

"Deep Packet Inspection (DPI)—Meaning and More". Available at https://www.fortinet.com/resources/cyberglossary/dpi-deep-packet-inspection. Available on Jan. 27, 2021) (Year: 2021).*

Extended European Search Report Issued in European Patent Application No. 22180527.8, dated Nov. 11, 2022 (13 Pages).

McLean. "Configuring ADAS Platforms for Automotive Applications Using Metaheuristics". Frontiers in Robotics and AI, vol. 8, Article 762227, 2022. pp. 1-21.

Sokcevic, Marija. "Real-Time Scheduling for Safe Autonomous Driving" TTTech Auto, Aug. 23, 2021, www.tttech-auto.com/expert_insight/real-time-scheduling-for-safe-autonomous-driving/. Accessed Jan. 23, 2022.

"Nerve Blue 2.0 Documentation", https://docs.nerve.cloud/2.0.0/user_guide/introduction. Accessed Jan. 1, 2020.

"Nerve—Edge Intelligence for Industrial Automation" TTTech Industrial, https://www.tttech.com/wp-content/uploads/www.tttech.com/wp-content/uploads/TTTech_Fog-Computing_White-paper.pdf. Accessed Jan. 1, 2018.

"Nerve Features" TTTech Industrial, https://www.tttech-industrial.com/products/nerve/nerve-features. Accessed Dec. 4, 2021.

* cited by examiner

COMPUTER SYSTEM AND METHOD FOR EXECUTING AN AUTOMOTIVE CUSTOMER FUNCTION

CROSS-REFERENCE TO RELATED APPLICATIONS

This application claims priority to and the benefit of EP 22180527.8, filed Jun. 22, 2022, which is hereby incorporated by reference herein in its entirety.

FIELD

The invention relates to a computer system for executing a customer function, in particular an automotive customer function, wherein the customer function generates customer function output data, based on which a machine, in particular an automobile, is controlled, wherein the computer system comprises one or more processing cores.

Furthermore the invention relates to a method for executing a customer function, in particular an automotive customer function, in a computer system wherein the customer function generates customer function output data, based on which a machine, in particular an automobile, is controlled, wherein the computer system comprises one or more processing cores.

BACKGROUND

Modern real-time systems, in particular automotive real-time systems comprise many complex software components to handle complexity and to simplify development. An automated driving function, like a highway pilot, is broken down into multiple smaller components that are participating, both in sequence and potentially in parallel, to fulfill the respective function of the vehicle.

For such real-time systems it is paramount to be able to determine and guarantee worst case end-to-end computing latencies from an observation of the environment of the vehicle to a physical reaction of the vehicle. For example if an obstacle in front of the vehicle is registered by a sensor subsystem of the vehicle a vehicle level reaction (steering or breaking) to avoid a collision must be initiated within a certain time to prevent human harm.

Such a processing chain (henceforth called computational chain) ranges from processing sensor inputs over computing a world model and generating an actuator command, and typically comprises of a huge number of individual software components. There can be a multitude of concurrently executed functions. Hence many independent computational chains are executed concurrently. Those software components can have strongly varying complexity and run-time behaviour.

Computational chains can be spread over multiple processing units or even ECUs, but may also be executed on a single processing element (e.g., a single CPU, which for example comprises multiple cores, and optionally accelerators).

Such processing element furthermore comprises many parallel and potentially diverse, processing units (CPU cores, GPUs, customer designed logic etc). In general, it is not possible to concurrently fulfill the processing needs of all software components. Arbitration mechanisms are needed to allow the most critical tasks to take precedence. Also, the parallel processing units are not 100% independent and the execution of software on one part can have a negative impact on the software executing on the other. This interference must be known and controlled.

Another important characteristic is that functions can have different levels of criticality, meaning how severe the risk to humans is when a function is not provided correctly and in time. It is state-of-the-art to provide a different level of engineering rigor based on this. Therefore, it cannot be guaranteed that low-criticality SWCs (software components) behave correctly. Critical SWCs need to be protected from such potentially faults SWCs to prevent safety critical failures, especially including failures that lead to the impact on the timing of critical SWCs.

Therefore, computational chains may have different priorities and even different components within a computational chain may have different importance. There is competition between and within computational chain for the shared resources that must be resolved.

A typical computer system also may include an operating system, a middleware and a large number of application software components.

It is the responsibility of the operating system to determine which tasks shall be allowed to use which processing units at a given time. However, the operating system has no knowledge of the order or connectedness of tasks. Therefore, the operating system is not directly capable to guarantee any End2End latencies on it's own.

To augment the operating system a middleware and a platform (computer system) scheduler may be used.

Determining the real-time requirements of all concurrently executing software components of the integration of multiple cooperating or independent applications is a major development activity requiring a large amount of effort on both the application developer's and the system integrator's side. Any change in a given component can not only change it's own temporal behaviour but potentially also invalidate the real-time properties of other applications.

In developing the overall system the Application Developer and the System Integrator must work together to ensure that all real-time requirements are met. However the application developer and the system integrator have conflicting requirements to effectively conduct their own work.

The application developer needs as much flexibility as possible to be able to develop and optimize his own application. They rely on the system integrator to ensure that there is as little interference from unrelated SWCs as possible. The system integrator relies on the application developer to fulfill the application level timing requirements but ensures that when all applications are integrated they all still function correctly. The system integrator typically strives for a as-static-and-rigid as possible system configuration to ensure that independent software components cannot invalidate the real-time properties of independent. Fulfilling the needs of both roles at the same time to facilitate efficient overall development is a huge challenge.

One example architecture that allows the deterministic co-existence of multiple computational chains while minimizing interference and guaranteeing end-to-end latencies is the Time Triggered Architecture. In this architecture the communication and execution of each schedulable entity (a task) is in lockstep. The integrator creates a global time-driven schedule that controls for each task exactly the time when it is allowed to access the processing hardware and when it loses control of this.

This approach simplifies the deterministic integration of independent software components (also denoted as "software" or "application") at the loss of flexibility of the application developer. Changing the application's decomposition into tasks is not possible without changing the platform-level defined schedule table which is defined on a platform-level/computer system level. Also, if the implementation of a task changes and with it it's timing budget, changes in the schedule are required which have to be done by the computer system integrator.

The software developer on the other hand gains the insurance that software components cannot negatively affect his tasks.

A further architectural is the event driven architecture. Here, the execution of schedulable entities depends purely on the arrival time of new events. As soon as all events for a task are available it is potentially allowed to execute. Since there is no platform-level control of how and when tasks are executed the application developer is free to add, remove or merge tasks within his application freely. This allows maximum flexibility for the software developer and also allows to minimize delays between execution of subsequent tasks in the best and average case, but not the worst case. However since the number of such tasks can go in the hundreds or thousands it is very hard to determine the worst case delay until when it can really be started. Temporal behaviour will change whenever a new application is integrated. This also means that it is unclear which other components are executed on other processing units making it impossible to assess the worst case impact of SWCs executing in parallel. Also any change to the application internals can change the severity of interference to other software components.

This approach maximizes the flexibility of the software developer at the expense of shifting problems to the integration step. This leads to unclear accountability for problems and leads to extensive debugging needs for all application developers when multiple applications are integrated together.

In either case the granularity of the dispatched entity is on task level. Since an application comprises a large number of task the integrator has to configure and control aspects that are in the control of the application developer. Therefore changes to the application structure are globally visible and require extensive analysis and configuration changes.

There already exist approaches that group multiple tasks into a container and control the timing aspects of containers. This means that containers get a certain share of the processing units and are stopped if they reach a bound. For example Linux CGROUPS, which can be used by Docker to control the timing of applications within Docker containers, can be used to limit the CPU time available to the contained applications to at most a certain percentage of CPU Time. This prevents interference but is not possible to give end2end latencies for the processing within a container. Also the container execution and book keeping of the used CPU/core time are not aligned with the processing cycle or any specific event in the system. This unalignment can lead to unwanted interruption during the processing. In particular, these approaches do not deal with the internal order of task execution.

SUMMARY

It is an object of the invention to provide a computer system and a method to enable faster development without sacrificing predictability regarding the end-to-end real-time latency requirements for a computation chain.

This object is achieved with a computer system as mentioned above, wherein according to the invention wherein the customer function comprises applications, wherein each application of the customer function comprises a multitude of different tasks, wherein during the execution of an application one or more tasks of said application are executed, wherein said applications are executed in form of a computation chain one after the other in a defined sequence, wherein a computation chain receives customer function input data at its start and generates customer function output data, which are provided at the end of the execution of the computation chain, and wherein during execution of the customer function said computation chain is executed once or several times, wherein the computer system provides containers, wherein the computer system is configured to activate and de-activate said containers, so that a container is active or inactive, wherein all tasks of the applications are assigned to containers, and wherein all tasks of each specific application are assigned to exactly one specific container, wherein in a timeframe, during which a container is active, one or more cores of the computer system are exclusively reserved for the execution of the tasks of the application of said container, and wherein the computer system is configured such that when a container is inactive, the tasks of said container cannot be executed on the computer system, wherein the computer system is configured to executed the containers according to the sequence of the applications, so that a container is activated before his immediately following container, and wherein a container and its immediately following container of a computation chain are not allowed to overlap in time, and wherein for each container a task sequencer is provided, wherein said task sequencer is activated when its container is activated, and wherein the task sequencer of a container decides ("task-sequencer-decision"), which of the tasks of the application of the container have to be executed, the sequence of tasks to be executed, and for each task, which has to be executed, the core or cores which the container provided, on which core or cores the task has to be executed, and wherein the computer system is configured to executed the tasks of each container according to said task-sequencer-decision of the task sequencer of each of the containers.

This creates a hierarchical scheduling approach, wherein the container resource usage is controlled by the computer system/platform, whereas the task resource requirements are managed by the task sequencer within the container. Controlling the container enables or removes access of tasks to compute resources forcefully without requiring cooperation from the tasks. Moreover, this combination of both approaches enables to guarantee computation chain execution even though neither, the container scheduler, nor the task scheduler have a complete view of the overall system.

In the present context the term "container" is an abstract entity and used in a linguistic sense, but not in the sense of the technology "Docker" which uses the same terminology. In contrast to Docker the present invention allows to control resource usage of all entities (tasks) implicitly by operating on the "container" entity itself.

During a time period where a container is active, one or more cores are exclusively assigned to said container, so that the applications/tasks assigned to said container have exclusive access to said core(s) and can run exclusively on said core(s). Only the applications/tasks of said container can be executed on said core(s). No other containers, in particular applications/tasks of said other containers can run on said core(s) in this time period.

If the active container is de-activated, so that said container becomes inactive, said inactive container, in particular the applications and/or tasks assigned to this container, is/are still ready to run but it's/their execution (the execution of applications and/or tasks of this container) is suspended. This does not change the state of the application(s) and/or task(s) of said container but ensures that no core time of the core(s), which is/are exclusively assigned to said container when said container is active, can be used by the inactive container (in particular by the application(s)/tasks(s) of said inactive container).

From the implementation side, de-activating and activating of containers may be realized by transmitting signals (e.g., SIGSTOP and SIGCONT) to the process that implements the container. In a POSIX operating system those signals are intercepted by the operating system scheduler and a SIGSTOP signal forces the operating system scheduler to immediately stop executing all tasks within the targeted process. Furthermore it prevents the scheduler from executing any task from the specific process until an activation signal to continue (e.g., SIGCONT) is received. Sending those signals can be triggered by a platform scheduler for example according to it's time triggered schedule. In this case, a container is equal to a single POSIX process and the platform scheduler addresses directly the container and need not be aware of the tasks within the container.

In other implementations it may be provided that the platform scheduler maintains or has access to a list of all processes that implement a container and sends a signal to all contained processes. In yet another implementation the platform scheduler could also directly maintain the list of all tasks that belong to a container, and signal the operating system scheduler directly the tasks of the container to be activated or de-activated. Lastly the platform scheduler could also be equal the operating system scheduler which allows to implement the same semantics without relying on controlling processes and threads in such an indirect manner.

The object is also achieved with a method described above, wherein according to the invention the customer function comprises applications, wherein each application of the customer function comprises a multitude of different tasks, wherein during the execution of an application one or more tasks of said application are executed, wherein said applications are executed in form of a computation chain one after the other in a defined sequence, wherein a computation chain receives customer function input data at its start and generates customer function output data, which are provided at the end of the execution of the computation chain, and wherein during execution of the customer function said computation chain is executed once or several times, wherein the computer system provides containers, wherein the computer system is configured to activate and de-activate said containers, so that a container is active or inactive, wherein all tasks of the applications are assigned to containers, and wherein all tasks of each specific application are assigned to exactly one specific container, wherein in a timeframe, during which a container is active, one or more cores of the computer system are exclusively reserved for the execution of the tasks of the application of said container, and wherein the computer system is configured such that when a container is inactive, the tasks of said container cannot be executed on the computer system, wherein the computer system is configured to executed the containers according to the sequence of the applications, so that a container is activated before his immediately following container, and wherein a container and its immediately following container of a computation chain are not allowed to overlap in time, and wherein for each container a task sequencer is provided, wherein said task sequencer is activated when its container is activated, and wherein the task sequencer of a container decides ("task-sequencer-decision"),

- which of the tasks of the application of the container have to be executed,
- the sequence of tasks to be executed, and
- for each task, which has to be executed, the core or cores which the container provided, on which core or cores the task has to be executed, and wherein the computer system is configured to executed the tasks of each container according to said task-sequencer-decision of the task sequencer of each of the containers.

The invention simplifies developing and configuration of computer systems, in particular of automotive real-time computer systems. The amount of configuration done by an integrator is minimized because he does not need to model communication and execution flow within a container. This is moved to the responsibility of the application developer.

Concurrently it is possible to guarantee worst-case latencies for computational chains and freedom from interference between applications.

Software (e.g., applications) within a vehicle has to address a lot of different functionality that may be completely independent of each other, but nevertheless require a high level of security. As these functionalities do not depend on each other, it is only required that certain resources are provided to guarantee their availability for the safety of the car.

The software developers of such independent functionalities do no longer have to align with each other. They just have to request the resources (in form of a container) by the integrator. If there are further resources available (e.g. a more powerful hardware and system), additional applications might be easily integrated at a later point by adding a new container. Even applications can be changed, as long as the resources provided by the assigned container suffice.

Usually, the computer system is configured to execute only one task at one point in time, and to execute a task exactly on one core at one point in time.

An application is not bound to one computer component, in particular to one core, but can be divided among several computer components, in particular to several cores. The smallest indivisible unit is the task. A task cannot be distributed to several computer components, in particular cores.

The task sequencer decides, which tasks of the application/container have to be executed and which cores of the container they have to use for their execution. This decision of the task sequencer is implemented by the computer system, in particular an operating system of the computer system (for example, a scheduler of the operating system must take the decision of the task sequencer into account and executes the tasks accordingly).

The task sequencer of a container is started each time the container is activated, wherein the task sequencer preferably is the first task which is started in the container. For example, the task scheduler is scheduled by the operating system, in particular by the scheduler of the operating system of the computer system.

The use of containers according to the invention has the effect, that the configuration of the computer system is adapted in a way that tasks are not allowed to run during timeframes where its container is not active.

A task within a container can be assigned by the task sequencer to one of the free cores.

Typically, the first application of the computational chain receives input data from sensors and calculates output data based on these input data. Said output data are provided for the next application of this computational chain, which generates output data based on said input data, and so on. The last application of the computational chain generates output data which are provided for actuators etc., for example to maneuver a vehicle.

Usually, a computational chain is executed again and again in succession over a certain period of time, and accordingly, the containers are active several times in succession. It may be provided that a task sequencer executes tasks in identical order during each time period/timeframe, which its container is active, however, typically it may be provided that the task sequencer executes tasks in different order during different time periods, where the container is active.

With respect to terminology used, the following phrases shall have the respective meanings indicated:

- "application is executed": tasks (some or all tasks) of said applications are executed
- "container is executed": tasks (some or all tasks) of the application, which is assigned to said container are executed
- "application communicates": one or more tasks of the application communicate, for example with the platform (computer system)
- "container communicates": one or more tasks of the application, which is assigned to said container, communicate, for example with the platform (computer system).

A computer system according to the invention comprises

- one processor with one core, or
- one processor with two or more cores, or
- two or more processors, wherein each processor comprises one or more cores.

It may be provided that an application, in particular all tasks of an application, are executed on one processor, for example on one or more cores of the processor. It may also be provided that an application, and accordingly the tasks of the application, is distributed over two or more processors.

Preferred implementations of the computer system and they method are described in the dependent claims.

It may be provided, that the computation chain is executed several times in parallel, wherein the computer system is configured such that the same containers of different computation chains, in particular of different iterations of the computational chain, do not overlap in time.

In this context, "same" containers means containers which "contain" the same tasks.

It may be provided, that the computer system is configured to activate each container and/or each computation chain according to a time-triggered schedule.

For example, in a time-triggered approach a defined time budget is assigned to each container, during which the container may be active, wherein a configured set of cores is assigned to each container. The time budget may be the same for all different containers of the chain, but different containers also may have different time budgets. The time budget, which corresponds to the above mentioned timeframe, may be "consumed" in one piece, or the time frame may be split into two or more time-slots, which together have a duration equal to the time budget.

Furthermore, in the time-triggered approach a "periodicity" may be provided for each container, which requires each container to periodically finish with said periodicity. The periodicity may be equal for all different containers of the chain and in this case is greater than the longest time budget of all containers of the chain.

Based on these boundaries, a schedule for activating and deactivating the containers of a computation chain and parallel computation chains can be generated, preferably using an offline tool for generating such schedules.

A computation chain of for example three container, CON1, CON2, CON3, may be repeated cyclically. Each such "iteration" of the chain is identical on the abstraction level of the containers. Accordingly, in each iteration the sequence of the containers is the same, and each container is activated at the same activation point in time (when counting the time beginning with zero for each iteration). In other words, after a computation chain is finished, it typically is repeated (several times), wherein the activation points in time and the deactivation points in time of the containers of a computation chain and its next iteration are "identical". Accordingly, each computation chain is repeated with a hypercycle period, which is n times the period of the specific containers, wherein n is the number of containers of the chain.

Parallel chains comprises the same order of containers, but the activation points in time (and typically also the deactivation points in time of the containers) in parallel chains may differ from each other. Furthermore, "parallel" chains are shifted in time such that the same containers of different chains do not overlap in time.

It may also be provided that the computer system is configured to activate the containers and/or the computation chains with activation signals, wherein said activation signal is event-triggered.

In this event-triggered case it may be provided that a priority is assigned to each container, so that if a container with a higher priority than the active container is activated, the active container is deactivated and the container with higher priority is activated. In this case the actually running container is immediately deactivated and can only continue when no container with a higher priority is active. The container, which has been stopped, continues where with the execution it was.

In particular, it may be provided that each task sequencer makes its task-sequencer-decision based on a configuration of the task sequencer.

For example, the configuration comprises priorities of the tasks of the container, wherein a priority is assigned to each task.

It may be of advantage if each task sequencer determines dependencies of tasks within its container and checks, in particular every time the execution of a task is finished, which task can be executed next, for example based on the configuration of the task sequencer.

Containers communicate with each other, in particular, the container n communicates only with container (n−1) and container (n+1). The communication preferably takes place via the platform (computer system) and not directly, so container (n−1) places its output data on the platform, where container n has access to these output data of container n.

Accordingly, preferably there is no direct communication between different container. There is clearly also no communication between task of different containers.

Tasks within a container communicate with each other, for example the first task "receives" input data form the previous container, generates based on these data output, which it provides to the next (second) task. Accordingly, the second task may only be started when the first task has finished its execution.

Accordingly, it is preferably provided that the task sequencer logs which tasks are already finished and every time a new task is finished the task sequencer has to update and check which tasks according its configuration, for example according to a template (see below) have now to be executed. There may be more than one task which may be decided by the task sequencer to be executed.

As already mentioned above, it may be provided that tasks of a container are executed in sequence and/or in parallel and/or at least partially overlapping in time.

It may be provided that for each application one or preferably more different arrangements for the execution of tasks, so-called "templates", are provided, wherein preferably each template for an application guarantees a correct order of the execution of the task, and wherein for example a configuration comprises one or more templates or wherein a configuration is a template.

A template defines a valid sequence for the execution of task within a container. For example, a template is created by an application developer and stored on the computer system as a file. The task sequencer reads this file when the application is initiated in the container.

According to the state of the art, the computation chain—namely the chain of tasks—guarantees (or defines) the correct order of the execution of the tasks of the computation chain. However, in the case that specific tasks are changed, additional tasks have to be included in the chain, etc. it may become necessary to adapt the whole computation chain of tasks.

According to the invention, the tasks are grouped, in particular on an abstract level, in applications, wherein the applications (correctly spoken the tasks of each application) are executed in containers. On this "container-level" only, for example by a container scheduler (also denoted as "platform scheduler" or "computer system scheduler"), the correct order of containers/applications can be guaranteed, but not a correct order of the execution of tasks within the containers.

This is done by the task sequencer: each task sequencer has to guarantee the correct order of execution of the tasks within its container. The use of templates allows to analyse a priori (different) correct temporal sequences (=templates) for the execution of tasks of the container. The combination of containers and task sequencers within the containers guarantees a correct order of execution of all tasks of the computation chain, but neither the platform/container scheduler needs to know the task templates (or order of tasks within a container) nor the task sequencer needs to know the container schedule or the templates of the other tasks.

Summarizing, within the timeframe (which may be split into two or more time-slots) during which a container is active tasks of the corresponding application are scheduled by the task scheduler. These tasks are independent of tasks in other containers, so tasks and the execution of tasks of one container can be configured independently from tasks of the other containers.

An external component, "sequence auditor", may be provided, which external component receives after each execution of a container the sequence in which the tasks were executed or information about said sequence and compares this sequence or information to the template, according to which the tasks have been executed, in order to detect incorrect execution orders.

This external component may report the error or performs an error reaction upon the detection of incorrect execution order.

It may be provided that a task sequencer, in particular each task sequencer, is configured to choose one of the templates provided for its container, for example at the start of the container or at the start of the container cycle, and/or to switch between different templates while the container is active.

Preferably, each time a container is started the task sequencer chooses a template.

For example, the task sequencer of a container may choose a specific template according to the actual state of the computer system or according to input data, or to switch between templates during the timeframe of the container.

It may be of advantage, when at least one task-sequence-adaption task may be provided for a container, in particular at least one task-sequence-adaption task for each container, which task-sequence-adaption task is executed while the container is active, wherein the task-sequence-adaption task is configured to receive information from and/or about the computer system, and/or to analyse data and/or the progress of time, and wherein the task-sequence-adaption task is configured to cause the task sequencer to change the template according to the information from and/or about the computer system and/or according to a result of the analysis of said data and/or the progress of time.

For example, information from and/or about the computer system may be the actual time, or the already used time during the active phase of the container, so that the task-sequence-adaption task knows whether there is sufficient time to finish the actual template or not, and to cause the task sequencer to change to another template, if necessary.

Furthermore, it may be provided that the computer system comprises resources, wherein the resources comprise
- memory, in particular memory areas, and/or
- communication means, such as communication channels, e.g. between processors and/or between cores, and/or
- software, such as an operating system, scheduler(s) for tasks, container, etc., and wherein at least some of said resources and/or at least parts of said resources or all of said resources are exclusively assigned to a specific container, when said container is active, so that when said specific container is active, only tasks of an application of said container can use said exclusively assigned resources.

It may be provided that each container receives its input data at its activation point in time and/or provides its output data to the computer system before the de-activation point in time.

If the container signals it's completion before the intended de-activation point (only for TT case) the scheduler is allowed to use the remaining time to execute other containers, or tasks that are not allocated to containers.

Furthermore, it may be provided that the de-activation point in time of a container of a computational chain and the activation point in time of the directly following container of said computational chain are arranged in a temporal distance which is sufficient to ensure all latency requirements of all computation chains while allowing at least sufficient time for the communication to happen between containers.

It may further be provided that the timeframe of a container, for example sum of the durations of the container time-slots of said container, corresponds to the WCET or at least to the WCET of the tasks of the application which is executed in said container.

In this context, preferably it is provided that the WCET of the tasks of the application is considering all container internal parallelism, and it is considered that the WCET of an application is smaller than the sum of all individual task WCETs.

It may also be provided that each application and/or container communicates exclusively with the computer system, and only at the start and at the end of it's execution, in particular at the start and the end of each iteration of it's execution.

BRIEF DESCRIPTION OF THE DRAWINGS

In the following the invention is described in detail by way of a non-restricting example as shown in the drawings. It shows FIG. 1 an example of a costumer function, FIG. 2 computation chains being executed in parallel, FIG. 3 a further example of computation chains being executed in parallel, FIG. 3*a* yet another example of computation chains being executed in parallel, FIG. 4 an example of a first application, FIG. 5 an example of a second application, FIG. 6 an example of a third application.

DETAILED DESCRIPTION

It should be noted that in the following the invention is described by hand of a specific example with a defined number of applications, tasks, etc. Furthermore, the following description is based on a time-triggered approach with respect to the execution of the containers.

However, the following statements are also valid in the general case, and not restricted to a specific number of applications, tasks etc., if not stated otherwise. Statements with respect to a specific container, in particular in connection with the execution of tasks of said containers, are also not limited to the time-triggered case but are also valid for the general case, in particular for the event triggered execution of containers.

Figure 1:
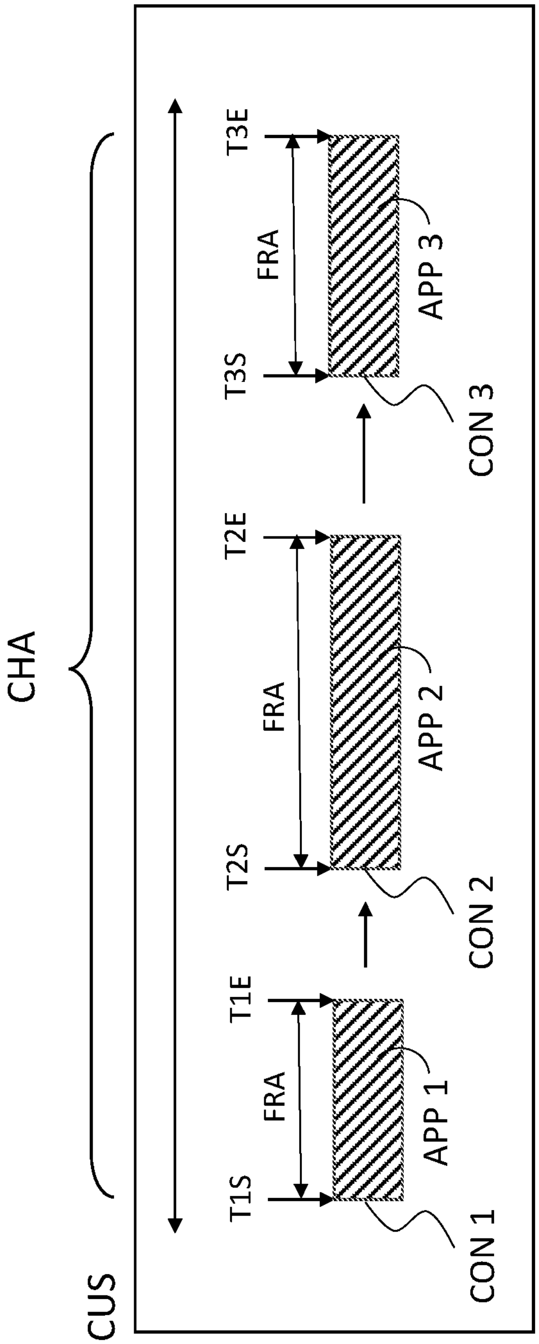

FIG. 1 shows an example of a customer function CUS, for example of a so-called "Highway Pilot"-function, which allows to maneuver a vehicle at least partially autonomous on a highway. This "Highway-Pilot" customer function controls the vehicle, based on sensor data collected by one or more sensors which monitor the surrounding of the vehicle and/or the vehicle itself, in that the customer function generates control data for actuators (e.g., for actuators for acceleration, braking, steering, . . . ) based on said sensor data.

In general, a customer function is realized by a computational chain CHA which comprises or consists of one or more, in particular several different applications APP1, APP2, APP3.

In the example shown, the computational chain CHA comprises three types of applications:

- The first application is a so-called "pre-processing" application APP1.
- The second application is a so-called "sensor fusion" application APP2.
- The third application is a so-called "path planning" application APP3.

The "pre-processing" application APP1 receives input data from various sensors, like radar, lidar, cameras or other sensors that observe the environment of the vehicle. The input data from the sensors are raw data which are pre-processed by the application APP1, so that they can be processed by the following application.

The "sensor fusion" application receives the data collected and pre-processed by the "pre-processing" application APP2 and creates an image of the environment, including free space, traffic signs and other rules related to a possible path for a car or vehicle.

The "path planning" application APP3 receives the data provided by "sensor fusion" application APP2 and calculates a path based for the vehicle. The result, i.e. the output data of this path planning may be commands for several actuators that control speed and direction etc. of the vehicle.

The different applications of the computational chain CHA are executed in sequence. The computational chain CHA may be executed cyclically. In the example shown, the first application APP1 is executed first, followed by the second application APP2, followed by the third application APP3. Each application APP2, APP3 starts its execution after the preceding application APP1, APP2 has finished execution.

Figure 2:
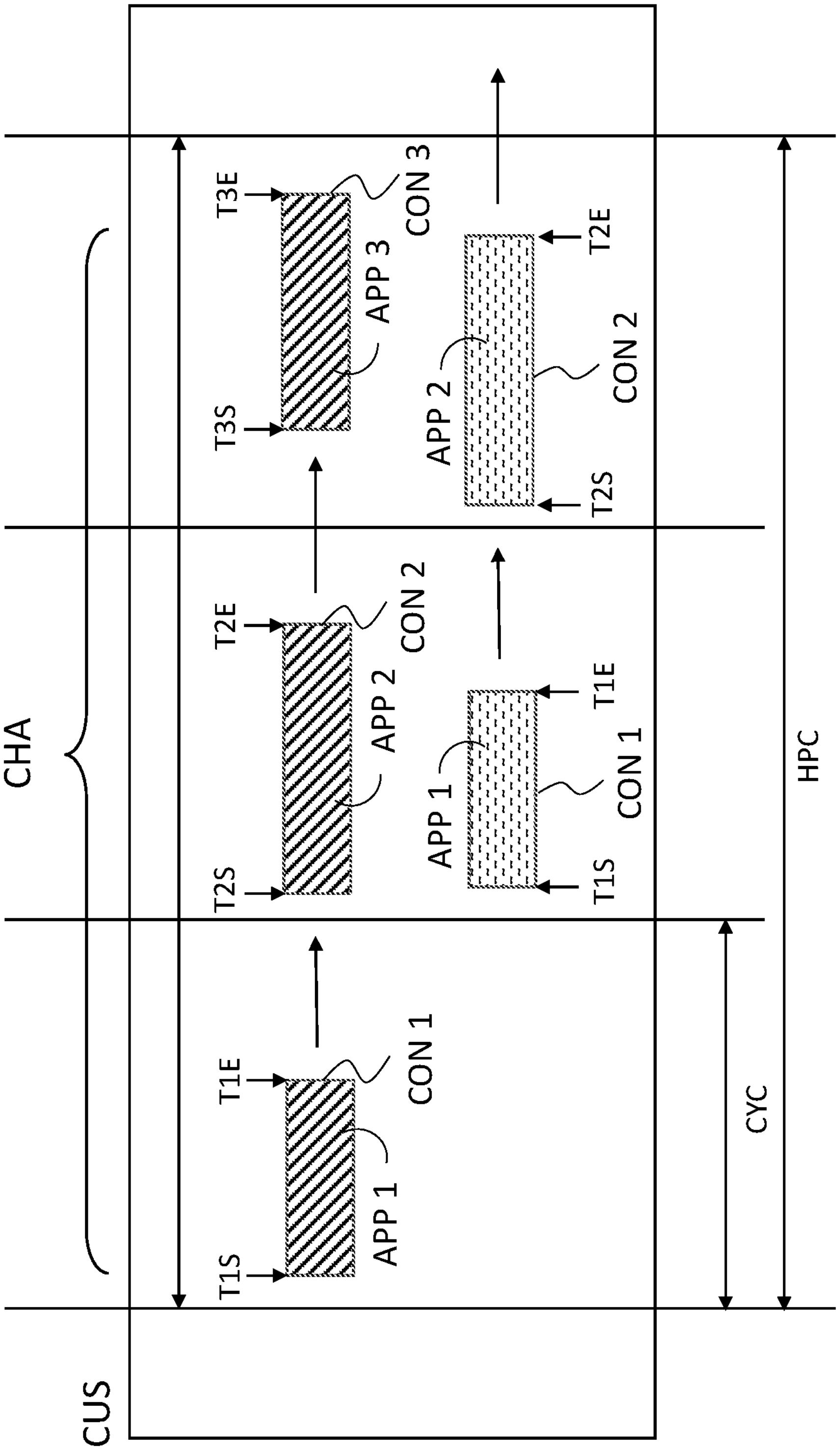

FIG. 2 in addition shows that the chain CHA can be executed in parallel. As soon as an application, e.g. application APP1 has finished execution, it may be started again in the next, "parallel" chain.

As shown in FIG. 2, it may be provided that each application APP1, APP2, APP3 is executed cyclically, wherein an application runs during a cycle CYC with a cycle period CP. For example, the cycle period is 40 ms.

According to the invention, each application APP1-APP3 is executed in a container CON1-CON3, wherein each application is assigned to exactly one container.

Each container CON1-CON3 has a guaranteed timing budget (also called "timeframe" FRA, as shown in FIG. 1), in the example shown the first container CON1 (for the first application APP1) has a budget with a duration of T1E-T1S, the second container CON2 (for the second application) with a duration of T2E-T2S, and the third container CON3 (for the third application APP3) with a duration T3E-T3S.

The term "container" is described in detail in the introduction of the description. In short, applications (or exactly spoken the tasks of the application) can only be executed during the timeframe during which the container is active. During periods of time where the container is inactive, the tasks/application of said container is not allowed to run on the computer system.

The different applications of a computational chain are executed in order one after the other, during a so-called "hypercycle", which hypercycle HPC is executed cyclically. The hypercycle HPC is characterized by a fixed hypercycle period HP. The hypercycle period HP, in the case the computational chain comprises n applications, is n times the cycle period, HP=n*CP.

Each of the both chains CHA shown is repeated cyclically with the hypercycle period HP.

Accordingly, each computational chain is finished within a hypercycle, which is cyclically repeated.

In general, an application/container receives input data and generates output data from said input data, which output data are then provided from the application/container to the next application/container (which uses said output data as input data) or to another device, for example to one or more actuators. The application/container do not communicate directly with each other, but each application/container provides the data to the computer system and receives data from the computer system.

In the example shown, the first application APP1 (first container CON1) receives as input sensor data, pre-processes said sensor data and generates output data, which are handed over to the second application APP2 (second container CON2). The second application APP2 executes a sensor fusion of said pre-processed sensor data, the output data are used by the third application APP3 (third container CON3) for a path planning. The path planning generates output data which are handed over to actuators of the vehicle to control the movement of the vehicle.

Figure 3:
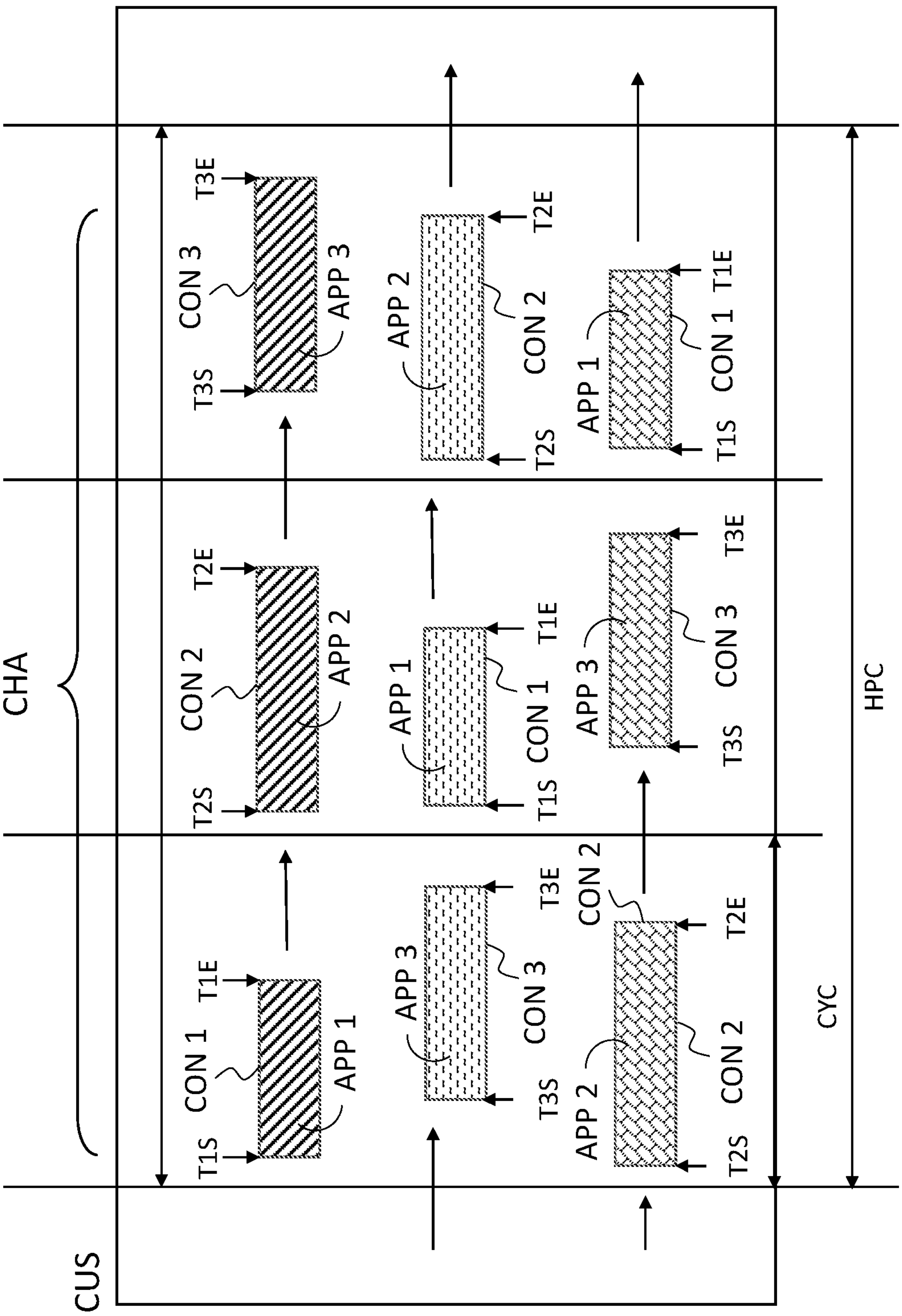

Finally, FIG. 3 in addition to FIG. 2 shows that in the case of three applications per chain each three chains can be executed in parallel. As can be seen form FIG. 3, each specific application can be executed only once at a specific point in time, so that the "parallel" running chains are shifted with respect to each other in time.

FIG. 3 shows a simple example wherein all three computational chains CHA, which are running in "parallel" and are only shifted in time (such, the identical containers of different chains do not run at the same time) are identical on a container-level. Accordingly, the same containers have the same position in time, length etc. in all three chains.

Figure 3A:
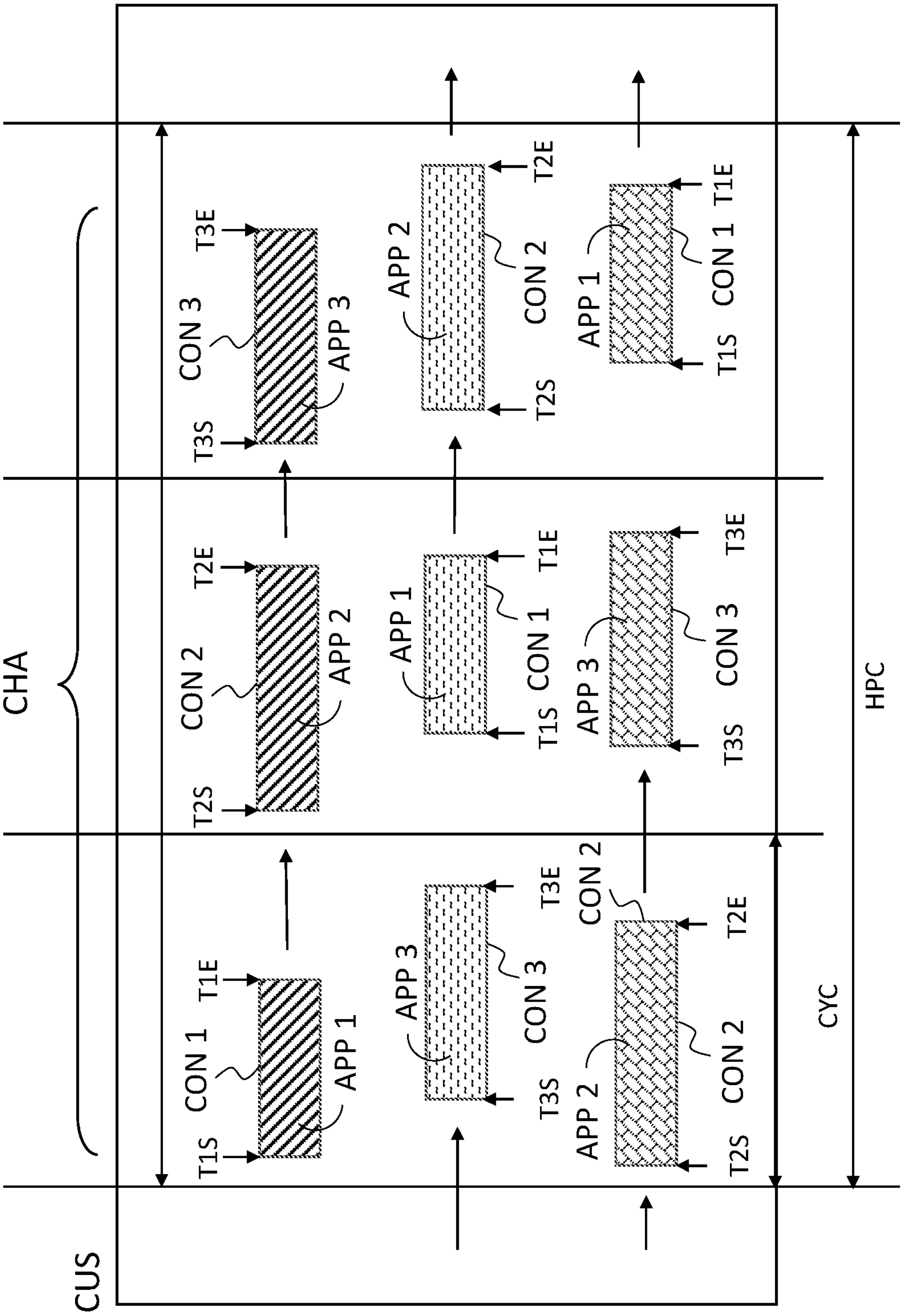

However, it may also be possible as shown in FIG. 3*a* that the computational chains already differ on the container-level. In this case, the order of the containers and the cycle period (e.g., ms in the example shown) stay the same in different chains, but the position of the containers with respect to the time, and preferably also with respect to the assigned cores, may different from chain to chain.

Each application APP1, APP2, APP3 comprises or consists of one or more application-specific tasks, which are executed in the specific container CON1, CON2, CON3 of the respective application.

Figure 4:
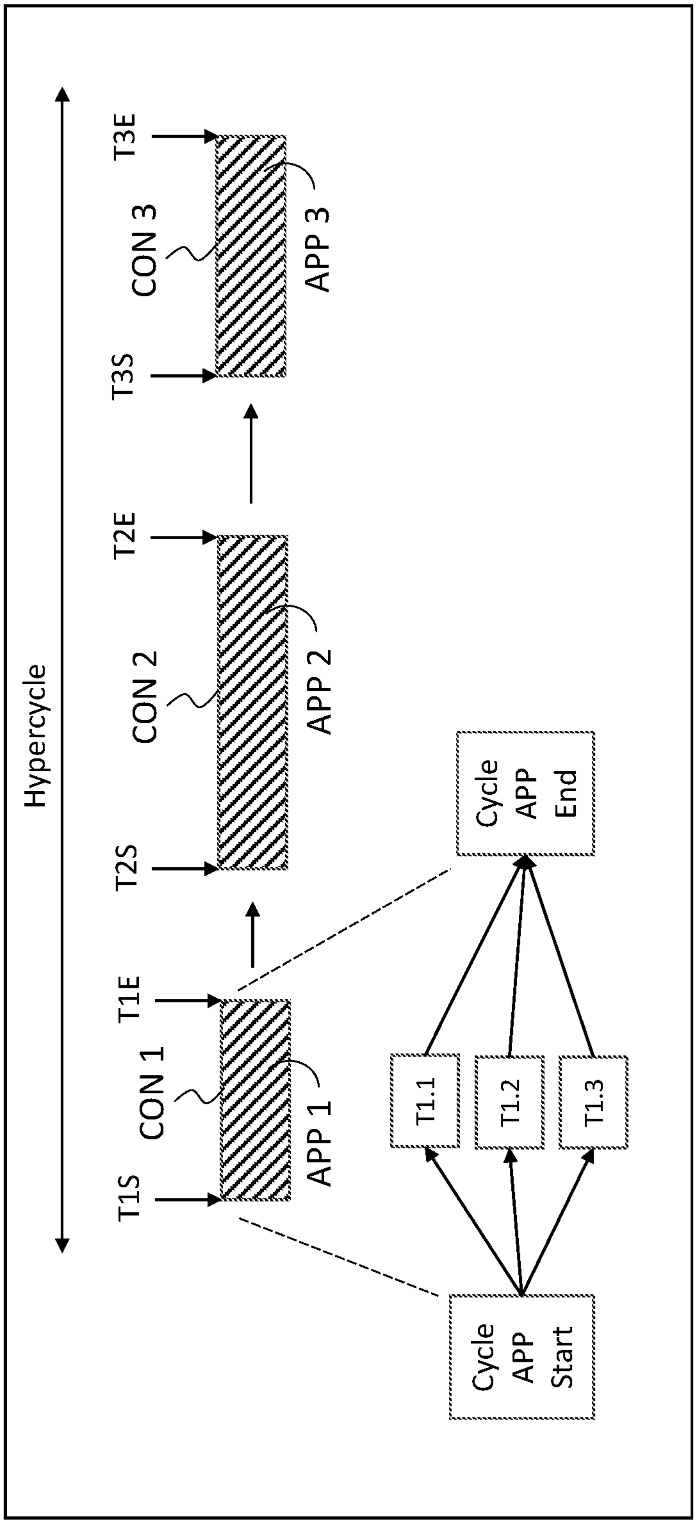

FIG. 4, as an example, shows the first application APP1 ("pre-processing") which is executed in container CON1. The application APP1 is broken down into/comprises several tasks, in the example shown 3 tasks:

Task 1.1: Pre-Process Camera data

Task 1.2: Pre-process Radar Data

Task 1.3: Pre-process LIDAR Data

Here, the tasks preferably are executed in parallel in the container CON1. At the end of the execution, the output of each task is handed over to the computer system and the second application APP2/container CON2 has access to said output.

Figure 5:
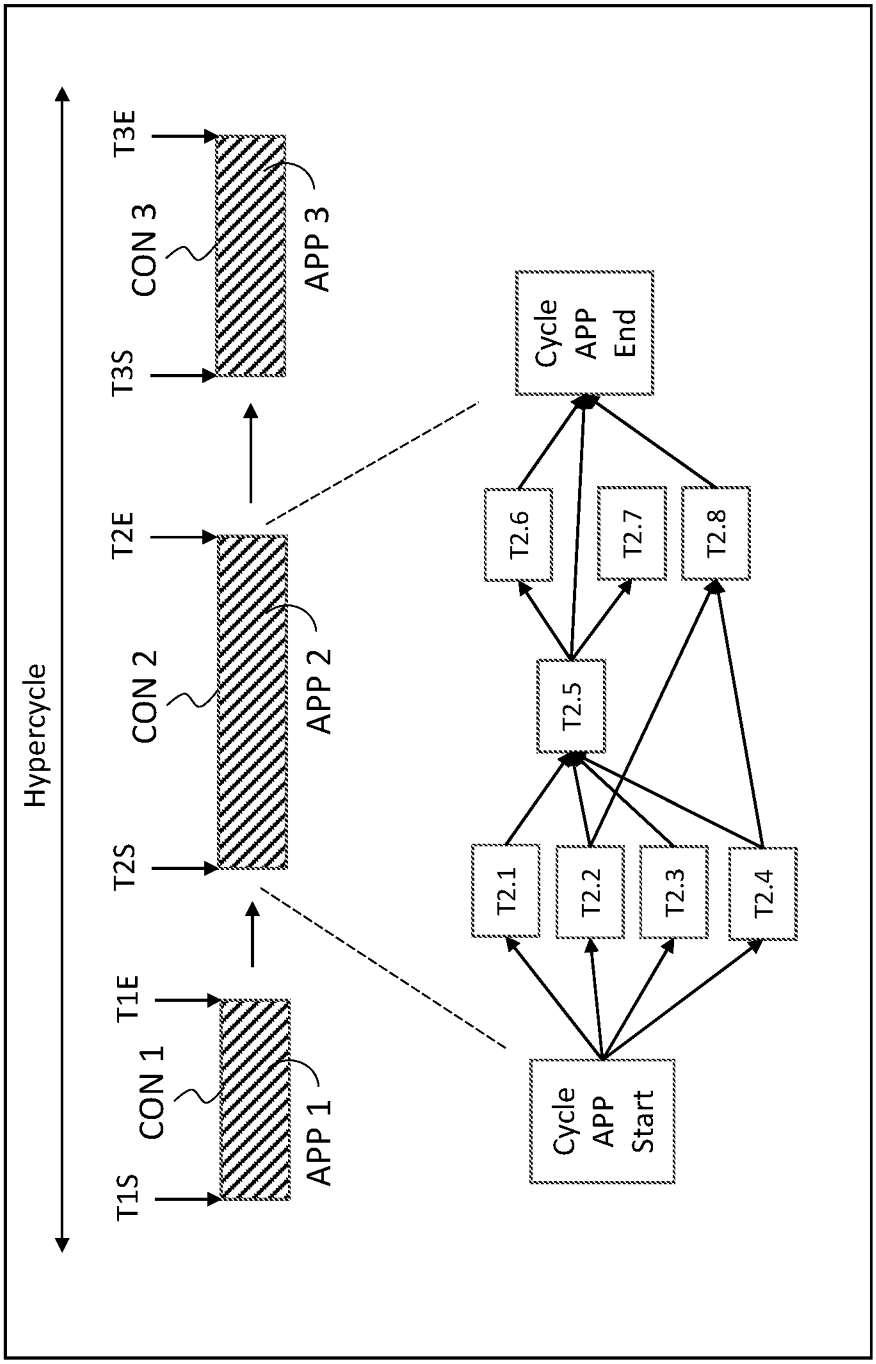

FIG. 5, as an example, shows the second application APP2 ("sensor fusion"), which is broken down into/comprises several tasks, in the example shown 8 tasks:

Task 2.1: Pre-fusion Camera Data

Task 2.2: Pre-fusion Radar Data

Task 2.3: Pre-fusion LIDAR Data

Task 2.4: Map

Task 2.5: Sensor Fusion

Task 2.6: Lane Detection

Task 2.7: Object classification

Task 2.8: Landmark classification

In general, the tasks of an application may be executed in sequence or all in parallel in their container (see FIG. 4), or as shown in FIG. 5, some of the tasks are executed in parallel whereas some of the tasks are executed in sequence, and/or the execution of different tasks may overlap. In the case shown, some of the tasks generate output which is used as input for another task or other tasks of the application APP2.

Figure 6:
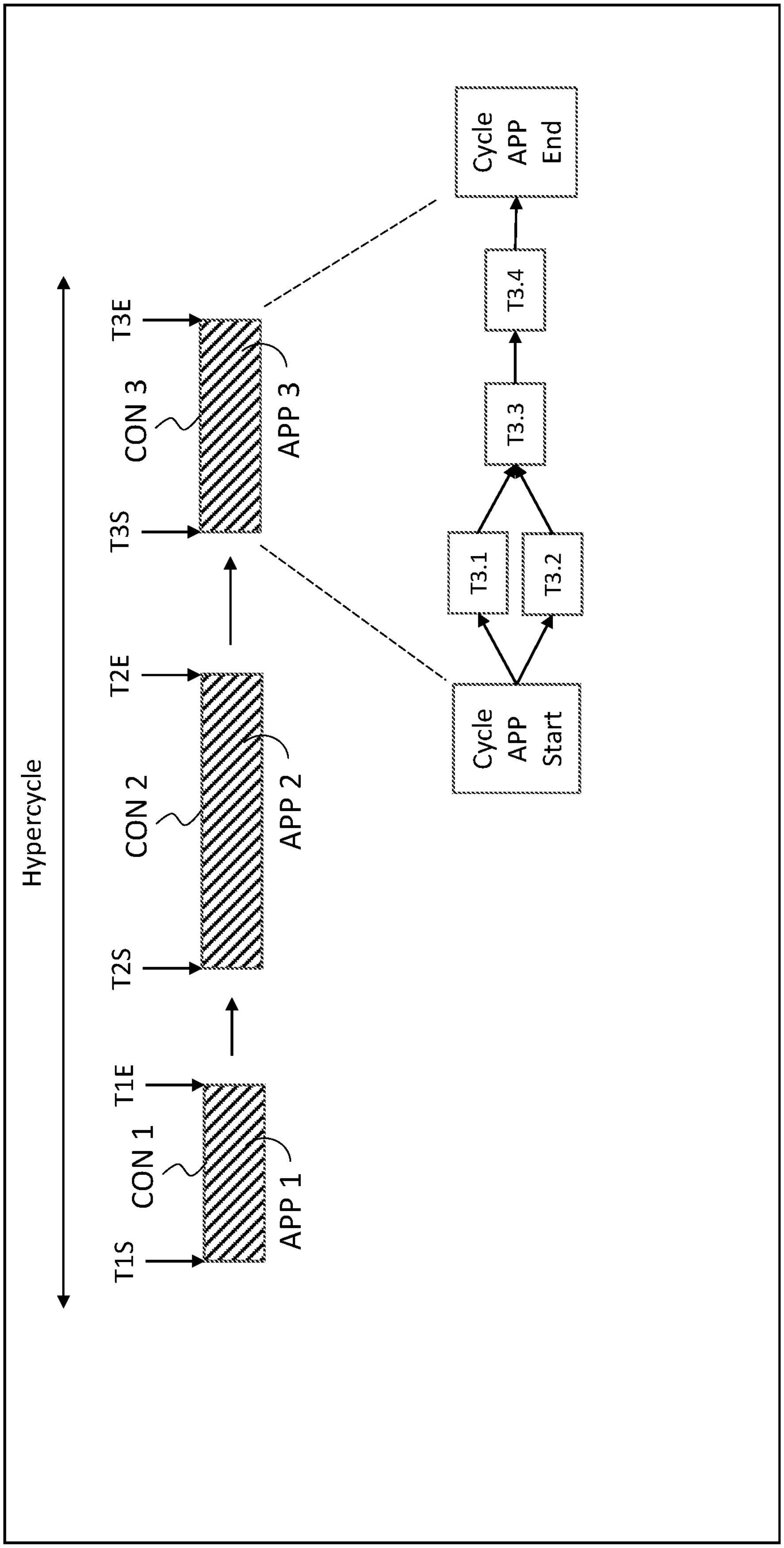

Finally, FIG. 6, as an example, shows the third application APP3 ("path planning"), which is broken down into/comprises several tasks, in the example shown into 4 tasks:

Task 3.1: Driver model

Task 3.2: Predict future object position

Task 3.3: Motion planning

Task 3.4: Compute actuator commands

The first two tasks, T3.1, T3.2, are executed in parallel and provided their output to the third task T3.3, which generates based on this input output for the fourth task T3.4, which generates actuator commands, which are transmitted as output to the actuators of the vehicle.

As already mentioned, according to the invention it is provided that each application runs in a so-called "container". The first application APP1 runs in a first container CON1, the second application APP2 runs in a second container CON2, and the third application APP3 runs in a third container CON3.

"Container" is a term describing an exclusive allocation of resources, (e.g., resources of the processor and/or of the operating system) to the timeframe during which a container is active. In particular, the computer system on which the tasks are executed comprises one or more processors/processing unit(s) (CPU), wherein each processor comprises one or more (computing) cores. During the active phase of a container, specific cores are exclusively reserved for the execution of tasks of the respective container.

An "application running in a container" means that some or all tasks of said application, which have to be executed, have exclusive access to the resources, in particular to cores of its container and are only and exclusively executed on and/or using these resources.

Figure 7:
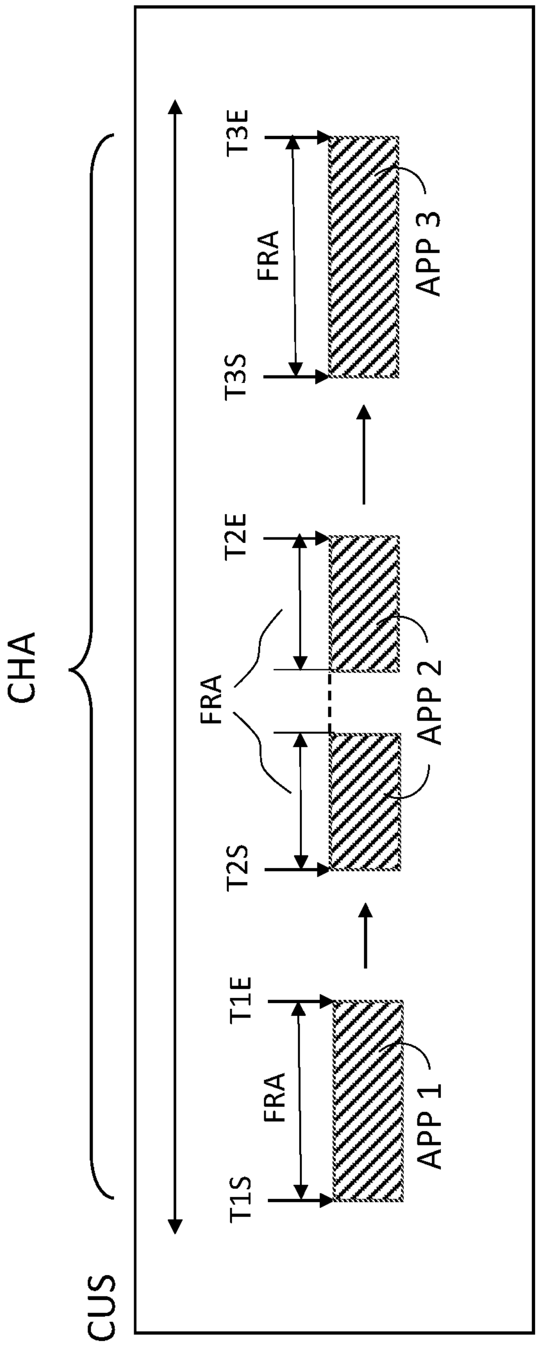
FIG. 7 shows an example where a container timeframe is divided into two time-slots, FIG. 8 a simple example of containers, FIG. 9 an example of two templates for the execution of the tasks of an application, FIG. 10 another example of templates, and FIG. 11 how the tasks of a template of FIG. 9 are distributed in time and on which cores the tasks may be executed.

In this context, FIG. 7 shows an example where the second container CON2 is divided into two time-slots—the tasks of the second application APP2 can only be executed during these two time slots.

Figure 8:
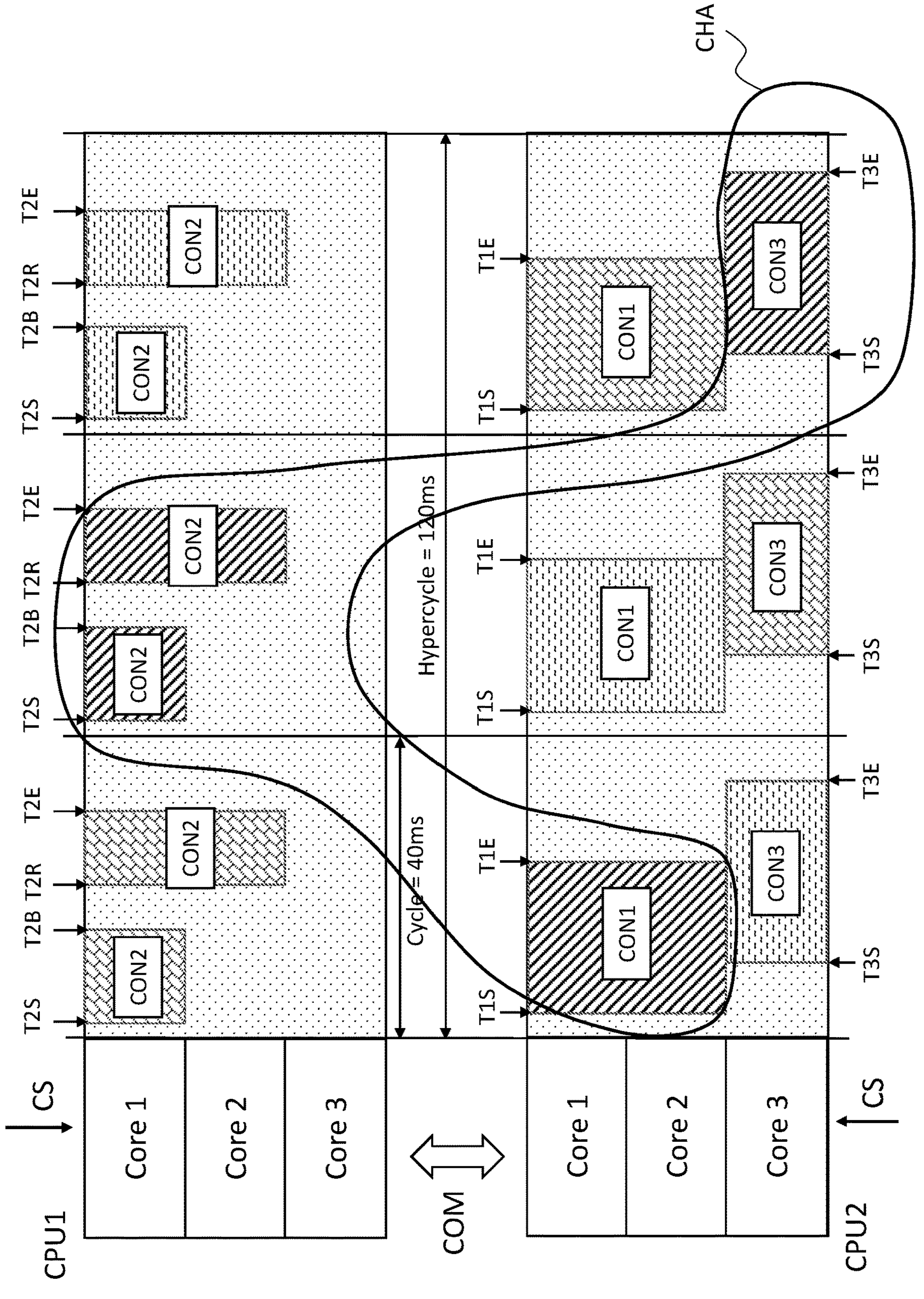

FIG. 8 shows a simple example of containers. In this example, a computer system CS is provided which comprises two processors CPU1, CPU2. It is assumed that the containers are distributed over the two processors CPU1, CPU2, whereas each processor comprises three cores Core 1, Core 2, Core 3, on which the tasks can be executed. Each core is configured to execute one task at one time.

As can be seen in FIG. 8, when looking at the first cycle (cycle length in this example=40 ms), (it should be noted that all indications of specific points in time or durations are merely illustrative), three computational chains are executed "in parallel", wherein containers of a specific chain are marked by the same hatching:

With respect to the "first" chain shown, a first container CON1 is provided, which is active from T1S to T1E. During this active phase the resources (in this example the cores) are assigned to said first container CON1 as follows:

- Cores Core 1, Core 2 of the second processor CPU2 are assigned exclusively to the container CON1;

Furthermore, a second container CON2 is provided, wherein the resources are assigned as follows:

- Core 1 of first processor CPU1 is assigned exclusively during a first timeslot T2S-T2B;
- Core 1 and Core 2 of first processor CPU1 are assigned exclusively during a second timeslot starting at T2R to T2E.

Finally, a third container CON3 is provided, wherein the resources are assigned as follows:

- Core Core 3 of CPU2 is assigned exclusively during a first timeslot/timeframe starting from T3S to T3E.

As mentioned above, the first application APP1 runs in the first container CON1. Accordingly, tasks of the first application APP1 are executed in the timeslots and the resources (cores) assigned to the timeslots according to the first container CON1.

Since the tasks of the first application APP1 have exclusive access to the cores in the respective timeslots, there is no interference with other task, for example with tasks of other applications.

Clearly, since the tasks of an application require specific resources and a specific time budget, the container for an application has to be configured in a way that the tasks of the application can all be completely executed (and finished) during each cycle and that sufficient time is left to hand over the output data of the application to a consumer.

Container CON1 of the first shown cycle produces, based on input data, output data for container CON2 of the second shown cycle. Container CON2 produces output for the container CON3 running in cycle three. Container CON3 in the third cycle produces output for actuators.

As already described, the containers in the example shown are executed cyclically, in other words, the containers are scheduled in a time triggered way and are started and stopped solely on the progression of physical time. During the start and the stop of the container (during the time where the container is active) the tasks of the application which is assigned to said container have exclusive access to the defined resources of the container.

Due to the fact that the tasks of an application run in a container, these tasks are independent of and unaffected by tasks in other containers, so that the tasks can be configured independently.

For sake of completeness it should be noted that in the case that the tasks of an application finish their execution before the end of the active phase of the their container, the container may be deactivated so that the resources of said container can be used by other tasks.

Within a container, the scheduling of the tasks is done by a task sequencer. The task sequencer is a specific task which is started when a container is activated, so that the task sequencer is the first task running in the container. The task sequencer is configured to decide, how the tasks within a container will be used by the application. This may, for example, be done based on the data that are provided to the container, which may reflect a certain state of the controlled devoice, e.g. a vehicle.

Typically, different so-called templates are provided for each container. A template is an arrangement of task of an application and the order how said tasks have to be executed.

Figure 9:
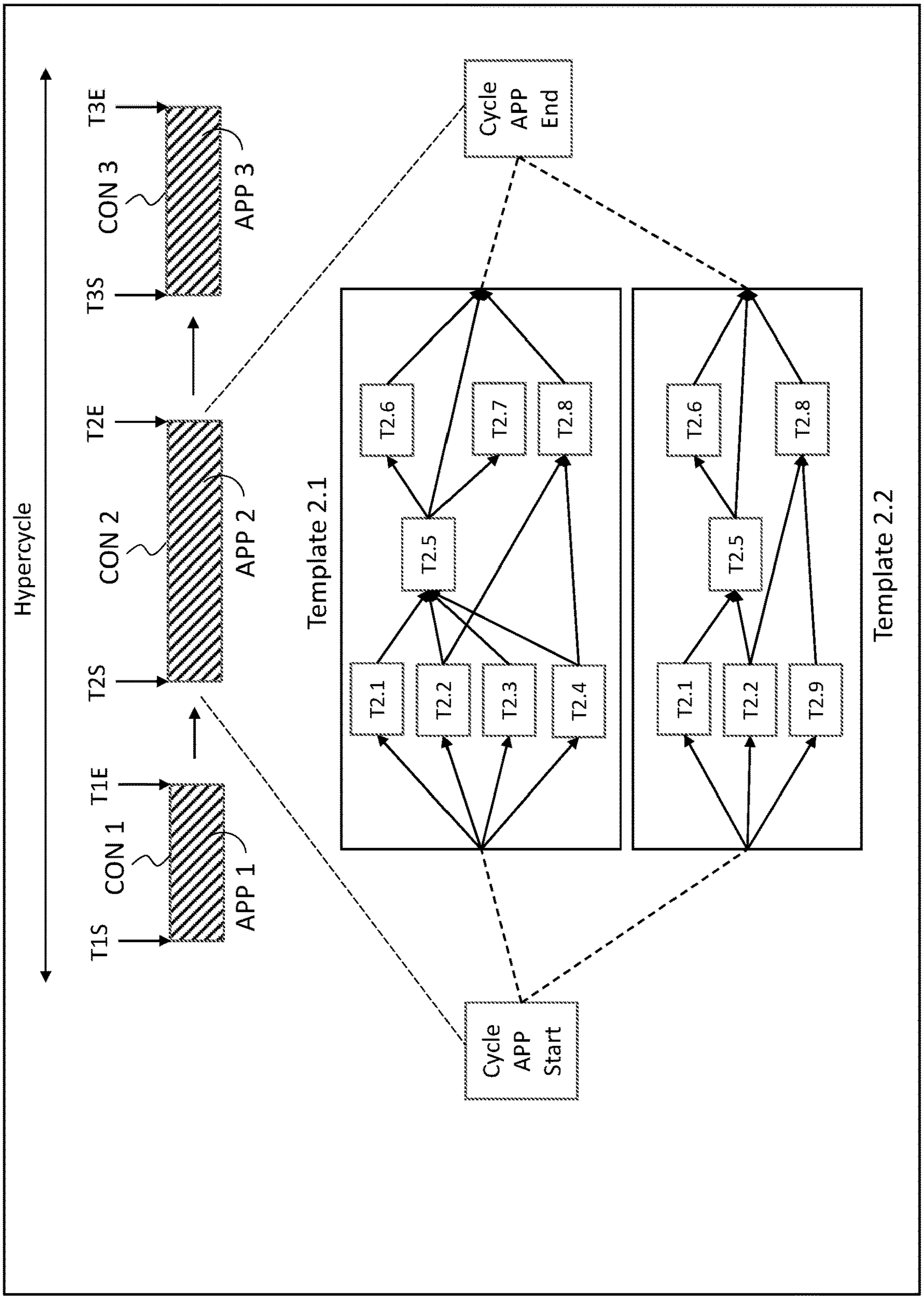

FIG. 9 shows an example of two templates 2.1, 2.2 for the execution of the tasks of the second application APP2. As can be seen the two templates differ in that specific tasks (tasks 2.3, 2.4, 2.7) of template 2.1 are missing in template 2.2. In return, template 2.2 comprises tasks 2.9, which is missing in template 2.1.

In this example it is provided that the task sequencer decides at the beginning of the container which template will be used for the execution of tasks of the application APP2.

Figure 10:
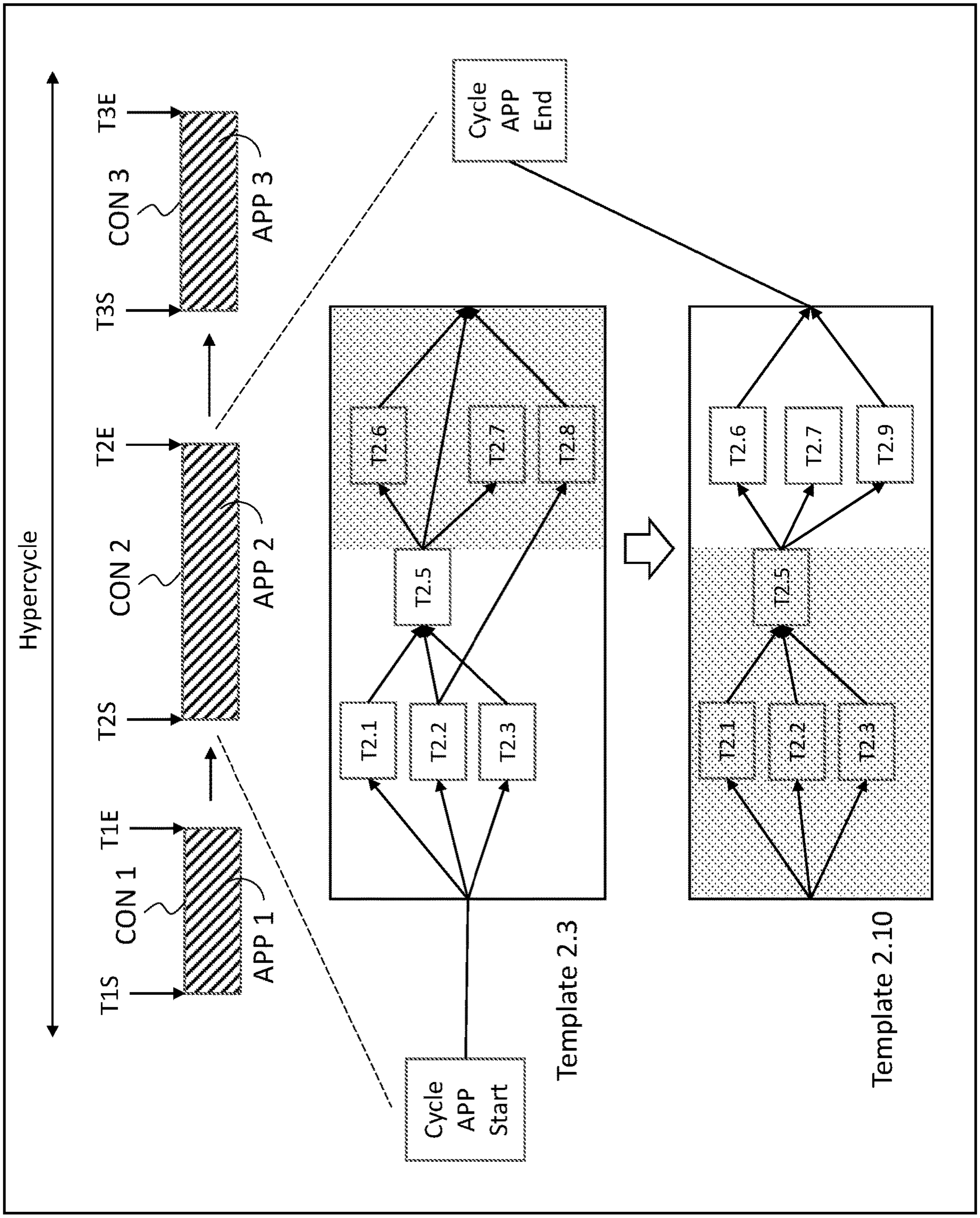

FIG. 10 shows another possibility. Here, the actual template is template 2.3, and the tasks are executed according to this template 2.3. Now, after execution of task 2.5 the task sequencer decides to switch to another template, here template 2.10. Typically, this is done according to specific information, in particular from outside of the container, which the task sequencer receivers, for example by a specific task (e.g., task 2.5 in this example), which is configured to receive information from outside the container or the computational chain.

Figure 11:
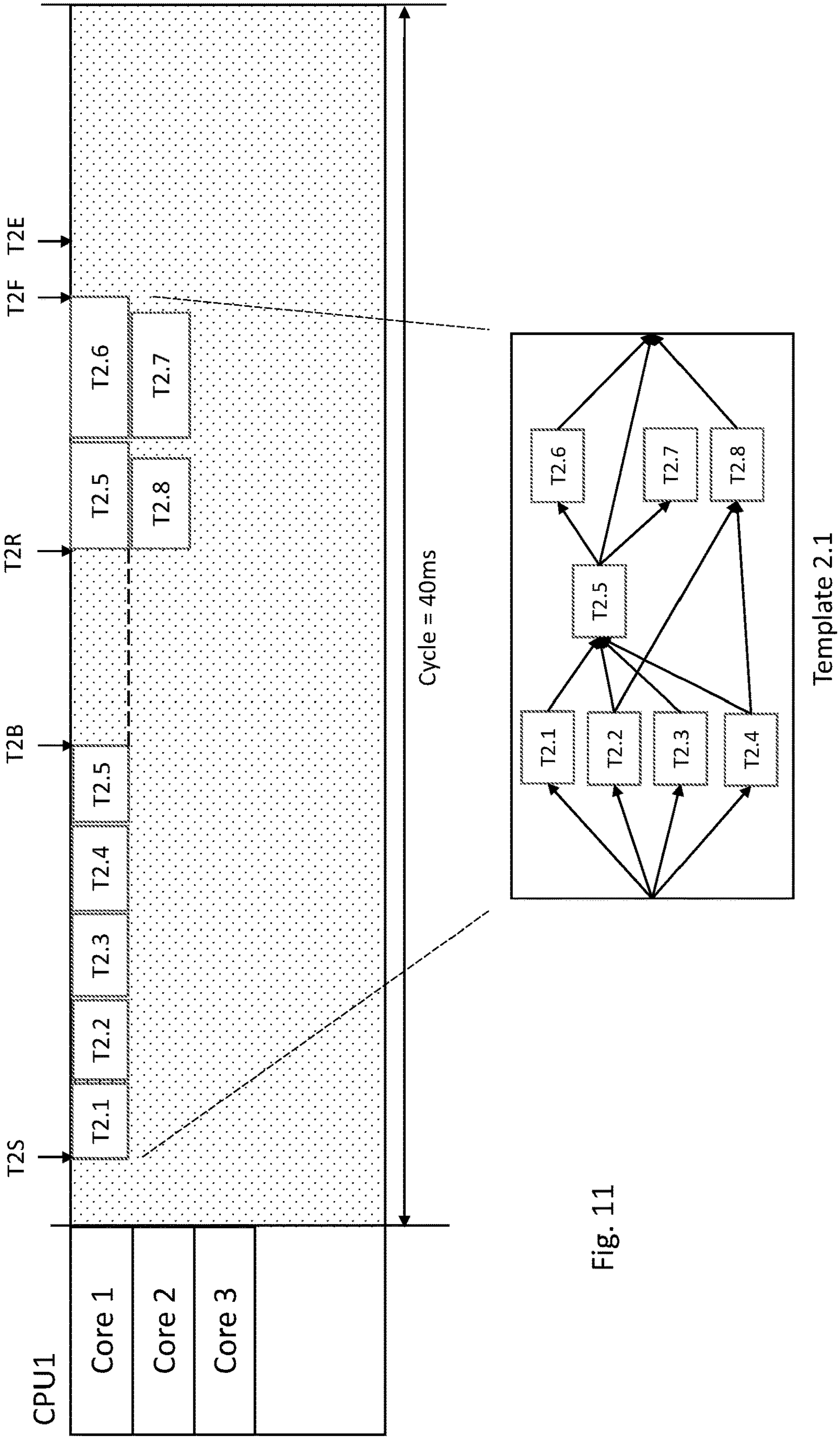

FIG. 11 finally shows how the tasks of a template (here a template according to the template 2.1 of FIG. 9) are distributed in time and on which cores the tasks are executed. In the example of FIG. 11, it is assumed that the container CON2 is active from T2S to T2B and again from T2R to T2E. As shown in this example, the execution of tasks ends already before T2E, namely at a point in time T2F. Accordingly, the resources of Container CON2, in particular the cores Core 1, Core 2 may be released at the point in time T2F, so that for example other tasks outside the container may be executed on these cores from this point in time on.

Accordingly, every time a container is running, a different chain of tasks may be invoked, for example depending on the input data and/or the actual status of the computer system and/or the machine which is controlled by the computer system.

For the platform (computer system) integration of the computational chain the following may be provided, for example realized in the form of an integration tool:

1) the computational chains (sequence and communication between containers) is modeled
2) a time triggered container schedule is generated based on the timing parameters of the computational chain (sequence of containers) and on parameters of the individual containers (period, timing budget, required number of processing element).
3) For each period/cycle the container may comprise one or more timeslots. The total length of the timeslots each period is equal to or larger than the timing budget of the tasks of the application of the container
4) All configurations required by the embedded software (operating system of the computer system are generated.

The platform preferably provides functionality to perform the following during runtime:

1) The platform sets up, for example from the tooling results, all communication interfaces to enable communication between containers
   a. The platform ensures that no undefined communication is possible
   b. Communication paths are never assigned directly to individual tasks within the container
2) The platform provides a mechanism to transfer data according to the communication connections
   a. The platform aligns the communication between the containers that it i) not interferes with the execution of any container and ii) ensures that all data required by a container is available at the start of its timeslot each cycle.
   b. All the container's output data will be made available at latest with the end of the last timeslot within a cycle
3) Based on the progression of physical time the container scheduler assigns processing resources to the containers, in particular using absolute physical time based triggering. This allows the system to synchronize the execution to all other containers and the outside world
   a. For this a timer is provided that invokes a container whenever a future start/end of a timeslot is reached.
   b. A container can be executed in one or multiple timeslots for each cycle. The container's execution can be interrupted at any point of time in the cycle and resumed based on the container's scheduler.
   c. Whenever the container scheduler is invoked (e.g. by a timer) it looks up in its static configuration which containers to stop and start next and which resources to assign
   d. It enables/disables the containers so only one container has access to the assigned processing resources i. For a POSIX system this can be done sending SIGCONT/SIGSTOP signals to the POSIX process implementing the container.

ii. Alternatively the container scheduler gathers all tasks contained within the process and sets them all to high/low priorities in order for them to not execute or guarantee to have exclusive access to the resources iii. Alternatively a new operating system container structure is introduced that can be used similarly in operating systems where this is not possible.

e. By enabeling the container all tasks within the container that can have their preconditions fulfilled will continue with their execution (for example as controlled by the task sequencer described above).

f. If the first timeslot of a new cycle is entered the container scheduler signals this to the container.

4) The platform ensures that processing resource allocation of containers cannot be changed from within a container 5) The platform supervises whether applications finish within their allocated timeslots 6) If the container fails to signal completion even though all it's time budget within a cycle is exhausted the platform detects and error and triggers an appropriate reaction, for example to forward an error message to other ECUs and/or to restart the host or failed software component.

7) When the processing chain within a container finishes before it's time budget is used up the remaining time can either be used to execute other tasks (especially low criticality background tasks) or other containers.

8) The time-triggered container scheduler may also act as task-scheduler to combine task scheduling and container scheduling in one component. In this case tasks of applications not being deployed as containers will be scheduled by the container schedule mechanism directly. Containers are executed cyclically and finish once every configured period. They are assigned a timing budget by the container scheduler to be used during this period.

Each container communicates via the platform strictly only at the start and end of each of its (processing) cycles. Incoming as well as outgoing data on these APIs provided by the computer system will only be made available at the start and end phase of a containers cycle. This is the case even if tasks use those APIs directly and provide data. This allows all containers to complete the processing of each cycle completely independent from the behavior of other containers.

The execution control of the tasks of a container by the task sequencer preferably is data-driven. Accordingly, the execution of tasks within a container is flexible because a task can be dispatched as soon as the respective preconditions are met, contrary to a time triggered dispatching where execution can only start at a defined point in time in the future. This provides the benefit that the worst case latency of the computational chain is not the sum of the individual worst case time budgets of each task. Typically the worst case timing of a computational chain is much less than that the sum of its components.

Since the execution of tasks of an application is completely encapsulated within its container no involvement of a system integrator is needed. Additionally, the configuration of a specific container cannot invalidate temporal properties of any other container.

In order to enable the communication between the tasks within a container, different approaches are possible. Because these approaches are independent from the platform configuration they can be different for each container and adapted to the application's concrete needs.

Preferably, tasks do not use the platform-communication APIs to communicate with each other. They can however use the platform APIs for external communication.

All communication between tasks is aligned with the start and end of the task processing. The communication can be triggered directly from a task or indirectly by the task sequencer. In the first case the tasks calls a write( ) function before returning. The write( ) function will directly make the data visible to the other tasks. In the second case it returns, invoking the task sequencer who then makes the data visible to other activities. In this case the tasks can progress completely independent from any other tasks.

The inter-task communication preferably is aligned with the starting/finishing of a task. Except for those two phases the tasks do not depend on other tasks and can progress independently from any other tasks.

At the end of a container's cycle all internal data that has been created within this cycle may be sent to an outside element for logging purposes. For this the memory area used to hold the data store is mapped to a read only accessible memory area outside of the container. An external data collector can be used to map this memory area into his own memory area and collect the data for future data replay. Data can then be sent to a debug PC or logged to a file.

In order to control the order of tasks within the container different approaches are possible. Because they are independent from the platform configuration this can be different for each container and adapted to the application's concrete needs.

Below describes one possible implementation for this task sequencer. The order of task execution required to fulfill the part of the computational chain allocated to a specific application is configured, for example by an application developer. This sequence will for example be a directed acyclical graph (template, as described above) and for each task a set of trigger condition is defined that indicates which tasks must have finished before it is ready to execute. Optionally the template may contain information about tasks like the minimum and/or maximum runtime of each task. The application developer provides the graph as an input file to the activity sequencer that is read during startup of the application. Furthermore he provides the functional code that implements the activity to the activity manager.

Different trigger conditions (task X after task A, X after (A and B), X after 2out-of-N-of (A,B,C,D) etc) are possible. However only (X after A, X after (A and B) provide data and order deterministic behavior of the container.

Each container may contain one or more of such graphs (also called templates, see discussion above). Those templates are defined beforehand and provided on the computer system, for example as human readable files (for example in a JSON, XML etc format). Those files are loaded at the initialization/activation time of the container. Switching between them is possible at runtime. This gives the developer much more freedom to adapt the container's runtime behavior while still ensuring that everything is defined statically which makes it easier to analyze. For example switching could be done based on container-internal conditions or input data semantics.

Example for a Task Sequence Processing

Once the container's cycle starts or a task finishes the task sequencer is invoked. It evaluates which tasks need to be dispatched next, based on the a/the directed acyclical graph (template) and for example the trigger conditions.

The task sequencer dispatches the tasks to a thread pool from where the OS scheduler takes ready threads and dispatches them onto the processing elements (cores). The mapping to a processing element can either be fixed or chosen by the scheduler depending on the container's resource restrictions.

The task sequencer is only able to assign tasks to processing elements that are defined at the container level. This way they can progress without dependency to other containers. This allows to determine the temporal behavior in isolation without the need to consider the behavior of other containers. This can therefore be done by the application developer without having to know or consider the existence of other containers.

The task sequencer also provides a mechanism to change the execution graph during the processing cycle of the container. For this special task-sequence-adaption tasks may be modelled within the a template.

The task-sequence-adaption tasks analyze conditions (semantics of output data of already executed tasks, amount of runtime time already spend within this cycle etc) and based on them can signal the task sequencer to execute a different template from this time on. After the task-sequence-adaption task has finished the task sequencer continues processing the tasks based on the newly switched to template.

Monitoring of Container Internal Sequence of Activation and Communication

It may be of advantage to determine the correct temporal behavior of the container. For this, two mechanisms may be used:

1) A watchdog functionality within the platform, outside the context of the container, checkpoints are triggered for example in "cycle start" and "cycle end" phases.
   a. If those checkpoints are not triggered according to the timing specification of the container an error is raised.

Since this mechanism is not able to detect out-of-sequence execution of tasks between the start and end tasks, another mechanism may be needed for this:

2) To detect out-of-sequence execution within the container the platform may provide a "task sequence auditor" component.
   a. At the initialization of the container all templates are registered with the "task sequence auditor" component.
   b. At the start of a cycle and whenever a template is switched an ID of the sequence that is to be executed by the task sequencer is reported to the "activity sequence auditor" component
   c. In addition in the "cycle end phase" the activation trace and the communication trace is provided to the "task sequence auditor component".
   d. The "task sequence auditor" component determines whether the observed communication and activation trace is in line with the preconfigured templates as well as the switches between them
   e. If a deviation between the pre-configured sequences and the traces of the real execution is found an error is reported The benefit of this is that the internal application behavior can be monitored by an external component to assess whether the execution within the container fulfills the intended behavior.

Example for a Task Sequence Auditor

During initialization of a container all templates may be forwarded to the external software component called "task sequence auditor". At the end of each execution of a container's cycle the task sequence trace is provided to the "task sequence auditor".

Based on the definition of the possible templates and trigger conditions the task sequence trace is assessed regarding it's conformity to the pre-defined template.

The task sequence auditor supervises the following correct execution properties of a container:

1) Non-execution of tasks
2) Multiple execution of tasks
3) Incorrect sequence of task execution
4) Incorrect point in time of switches of the templates
5) Incorrect switches between templates
6) If the templates contain min/max runtime budgets it can determine too-short or to-long execution of tasks If any of those conditions is detected an error is reported.

Possible Flow Through the Container's Cycle

The progression of the container may look as follows:

1) [Get allowed to run by the container scheduler]
2) Make all input data that is available on the platform interfaces available to the tasks
3) Invoke the task sequencer
4) The task sequencer dispatches the tasks according to it's configuration
   a. Dispatching can be done:
      i. directly by replacing the OS's scheduler with the task sequencer
      ii. Indirectly by dispatching them to a task pool from where the OS scheduler takes the tasks up and dispatches them
      iii. Or indirectly by setting up locks at the start of the task controlled by the task sequencer to allow them to start their execution
5) Whenever a task finishes the task sequencer is invoked and determines based on the task states and trigger conditions which task can be executed next
6) Once all tasks are executed a special "cycle end" phase is executed that gathers all data to be sent out and provides it on a container's external interfaces.
   a. Additionally a task trace may be sent to the task sequence auditor for evaluation
7) If the timing budget is not completely taken up it voluntarily gives up control and signals the completion to the platform
8) [Permission to execute is revoked by the container scheduler until he next cycle]

That which is claimed is:

1. A computer system for executing a customer function, wherein the customer function generates customer function output data based on which an automobile is controlled, wherein the computer system comprises:

one or more processing cores, wherein the customer function comprises two or more applications, wherein each application comprises a plurality of tasks, wherein during the execution of an application of the two or more applications one or more tasks of the plurality of tasks of said application are executed, wherein said two or more applications are executed in form of a computation chain one after the other in a defined sequence, wherein the computation chain receives customer function input data at its start and generates customer function output data, which are provided at the end of the execution of the computation chain, wherein during execution of the customer function said computation chain is executed once or several times, wherein the computer system provides containers, wherein the computer system is configured to activate and de-activate said containers, so that a container of the containers is active or inactive, wherein all tasks of the two or more applications are assigned to containers, and wherein all tasks of each specific application are assigned to exactly one specific container, wherein in a timeframe, during which a container is active, one or more processing cores of the computer system are exclusively reserved for the execution of the tasks of the application of said container, such that no other task of another container can run on said one or more exclusively-reserved processing cores during the timeframe, wherein the computer system is configured such that when a container is inactive, the execution of all tasks of said inactive container is suspended and prevented on the computer system, wherein the computer system is configured to execute the containers according to the defined sequence of the two or more applications, so that a container is activated before its immediately following container, and wherein activation timeframes of a container and its immediately following container of a computation chain are not allowed to overlap in time, wherein for each container a task sequencer is provided, wherein said task sequencer is a first task started in the container when the container is activated, and wherein the task sequencer of a container decides ("task-sequencer-decision") based on a directed acyclical graph defining task dependencies, which of the tasks of the application of the container have to be executed, a sequence of tasks to be executed, and for each task to be executed, on which of the one or more processing cores exclusively reserved for the container the task is to be executed, and wherein the computer system is configured to execute, during the activation timeframe of each container, the tasks of each container according to said task-sequencer-decision of the task sequencer of each of the containers.

2. The computer system according to claim 1, wherein the computation chain is executed several times in parallel, wherein the computer system is configured such that the same containers of different computation chains do not overlap in time.

3. The computer system according to claim 1, wherein the computer system is configured to activate each container and/or each computation chain according to a time-triggered schedule.

4. The computer system according to claim 1, wherein the computer system is configured to activate the containers and/or the computation chains with activation signals, wherein said activation signal is event-triggered.

5. The computer system according to claim 4, wherein a priority is assigned to each container, so that if a container with a higher priority than the active container is activated, the active container is deactivated and the container with higher priority is activated.

6. The computer system according to claim 1, wherein each task sequencer makes its task-sequencer-decision based on a configuration of the task sequencer.

7. The computer system according to claim 6, wherein the configuration comprises priorities of the tasks of the container, wherein a priority is assigned to each task.

8. The computer system according to claim 1, wherein each task sequencer determines dependencies of tasks within its container and checks every time the execution of a task is finished, which task can be executed next, based on the configuration of the task sequencer.

9. The computer system according to claim 1, wherein tasks of a container are executed in sequence and/or in parallel and/or at least partially overlapping in time.

10. The computer system according to claim 1, wherein for each application one or more different arrangements for the execution of tasks, so-called "templates", are provided, wherein each template for an application guarantees a correct order of the execution of the task, and wherein a configuration comprises one or more templates or wherein a configuration is a template.

11. The computer system according to claim 10, wherein an external component, "sequence auditor", is provided, which external component receives after each execution of a container the sequence in which the tasks were executed or information about said sequence and compares this sequence or information to the template, according to which the tasks have been executed, in order to detect incorrect execution orders.

12. The computer system according to claim 10, wherein a task sequencer is configured to choose one of the templates provided for its container, at a start of the container or at the start of a container cycle, and/or to switch between different templates while the container is active.

13. The computer system according to claim 10, wherein at least one task-sequence-adaption task may be provided for a container, which task-sequence-adaption task is executed while the container is active, wherein the task-sequence-adaption task is configured to receive information from and/or about the computer system, and/or to analyse data and/or the progress of time, and wherein the task-sequence-adaption task is configured to cause the task sequencer to change templates according to the information from and/or about the computer system and/or according to a result of the analysis of said data and/or the progress of time.

14. The computer system according to claim 1, wherein the computer system comprises resources, wherein the resources comprise memory, communication means, such as communication channels, e.g., between processors and/or between cores, and software, such as an operating system, scheduler(s) for tasks, container, etc., wherein at least some of said resources are exclusively assigned to a specific container when said container is active, so that when said specific container is active, only tasks of an application of said container can use said exclusively assigned resources, and wherein container resource usage is controlled by the computer system, whereas task resource requirements are managed by the task sequencer within the container.

15. The computer system according to claim 1, wherein each container receives its input data at its activation point in time and/or provides its output data to the computer system before the de-activation point in time.

16. The computer system according to claim 1, wherein the de-activation point in time of a container of a computation chain and the activation point in time of its immediately following container of said computation chain are arranged in a temporal distance which is sufficient to ensure all latency requirements of all computation chains while allowing at least sufficient time for communication to happen between containers.

17. The computer system according to claim 1, wherein the timeframe of a container, which is a sum of the durations of the container time-slots of said container, corresponds to a worst-case execution time at least to the worst-case execution time of the tasks of the application which is executed in said container.

18. The computer system according to claim 1, wherein that each application and/or container communicates exclusively with the computer system, and only at the start and at the end of its execution.

19. A method for executing a customer function comprising an automotive customer function, in a computer system, the method comprising:

generating, by the customer function, customer function output data, based on which a machine comprising an automobile, is controlled, wherein the computer system comprises one or more processing cores, wherein the customer function comprises two or more applications, wherein each application comprises a plurality of tasks, wherein during the execution of an application of the two or more applications one or more tasks of the plurality of tasks of said application are executed, wherein said applications are executed in form of a computation chain one after the other in a defined sequence, wherein a computation chain receives customer function input data at its start and generates customer function output data which are provided at the end of the execution of the computation chain, and wherein during execution of the customer function said computation chain is executed once or several times, wherein the computer system provides containers, wherein the computer system is configured to activate and de-activate said containers, so that a container of the containers is active or inactive, wherein all tasks of the applications are assigned to containers, and wherein all tasks of each specific application are assigned to exactly one specific container, wherein in a timeframe, during which a container is active, one or more processing cores of the computer system are exclusively reserved for the execution of the tasks of the application of said container, such that no task of another container can run on said one or more exclusively-reserved processing cores during the timeframe, and wherein the computer system is configured such that when a container is inactive, the execution of all tasks of said inactive container is suspended and prevented on the computer system, wherein the computer system is configured to execute the containers according to the defined sequence of the applications, so that a container is activated before its immediately following container, and wherein activation timeframes of a container and its immediately following container of a computation chain are not allowed to overlap in time, and wherein for each container a task sequencer is provided, wherein said task sequencer is a first task started in the container when the container is activated, and wherein the task sequencer of a container decides ("task-sequencer-decision") based on a directed acyclical graph defining task dependencies:

which of the tasks of the application of the container have to be executed, a sequence of tasks to be executed, and for each task, to be executed, the one or more processing cores reserved for the container, on which the task is to be executed, and wherein the computer system is configured to execute, during the activation timeframe of each container, the tasks of each container according to said task-sequencer-decision of the task sequencer of each of the containers.

20. The method according to claim 19, wherein the computation chain is executed several times in parallel, wherein the computer system is configured such that the same containers of different computation chains do not overlap in time.

21. The method according to claim 19, wherein the computer system is configured to activate each container and/or each computation chain according to a time-triggered schedule.

22. The method according to claim 19, wherein the computer system is configured to activate the containers and/or the computation chains with activation signals, wherein said activation signal is event-triggered.

23. The method according to claim 22, wherein a priority is assigned to each container, so that if a container with a higher priority than the active container is activated, the active container is deactivated and the container with higher priority is activated.

24. The method according to claim 19, wherein each task sequencer makes its task-sequencer-decision based on a configuration of the task sequencer.

25. The method according to claim 24, wherein the configuration comprises priorities of the tasks of the container, wherein a priority is assigned to each task.

26. The method according to claim 19, wherein each task sequencer determines dependencies of tasks within its container and checks every time the execution of a task is finished, which task can be executed next, based on the configuration of the task sequencer.

27. The method according to claim 19, wherein tasks of a container are executed in sequence and/or in parallel and/or at least partially overlapping in time.

28. The method according to claim 19, wherein for each application one or more different arrangements for the execution of tasks, so-called "templates", are provided, wherein preferably each template for an application guarantees a correct order of the execution of the task, and wherein a configuration comprises one or more templates or wherein a configuration is a template.

29. The method according to claim 28, wherein an external component, "sequence auditor", is provided, which external component receives after each execution of a container the sequence in which the tasks were executed or information about said sequence and compares this sequence or information to the template, according to which the tasks have been executed, in order to detect incorrect execution orders.

30. The method according to claim 28, wherein a task sequencer is configured to choose one of the templates provided for its container, at the start of the container or at a start of a container cycle, and/or to switch between different templates while the container is active.

31. The method according to claim 28, wherein at least one task-sequence-adaption task may be provided for a container, which task-sequence-adaption task is executed while the container is active, wherein the task-sequence-adaption task is configured to receive information from and/or about the computer system, and/or to analyse data and/or the progress of time, and wherein the task-sequence-adaption task is configured to cause the task sequencer to change templates according to the information from and/or about the computer system and/or according to a result of the analysis of said data and/or the progress of time.

32. The method according to claim 19, wherein the computer system comprises resources, wherein the resources comprise memory, communication means, such as communication channels, e.g., between processors and/or between cores, and software, such as an operating system, scheduler(s) for tasks, container, etc., wherein at least some of said resources are exclusively assigned to a specific container when said container is active, so that when said specific container is active, only tasks of an application of said container can use said exclusively assigned resources, and wherein container resource usage is controlled by the computer system, whereas task resource requirements are managed by the task sequencer within the container.

33. The method according to claim 19, wherein each container receives its input data at its activation point in time and/or provides its output data to the computer system before the de-activation point in time.

34. The method according to claim 19, wherein the de-activation point in time of a container of a computation chain and the activation point in time of its immediately following container of said computation chain are arranged in a temporal distance which is sufficient to ensure all latency requirements of all computation chains while allowing at least sufficient time for communication to happen between containers.

35. The method according to claim 19, wherein the timeframe of a container is a sum of the durations of the container time-slots of said container, corresponds to a worst-case execution time or at least to the worst-case execution time of the tasks of the application which is executed in said container.

36. A computer-implemented method for executing real-time applications in a vehicular computing platform, the method comprising:

controlling, by a platform scheduler executing on one or more processors, activation of a plurality of containers, each container encapsulating a respective set of application tasks;

assigning, by the platform scheduler, exclusive access to at least one processor core to a container only during an activation interval of that container, such that no task of another container executes on the at least one processor core during the activation interval;

executing, during the activation interval, only tasks belonging to the activated container on the at least one processor core;

enforcing, by the platform scheduler, a non-overlapping temporal execution order among containers of a computation chain such that activation intervals of containers in the computation chain do not overlap in time;

suspending execution of all tasks of a container outside the activation interval of that; and during the activation interval of a given container, managing, by a task sequencer, which is a task started within the given container and independent of the platform scheduler, an execution order of tasks belonging to the given container on the at least one processor core, and deciding, for each task to be executed, on which of the at least one processor core exclusively assigned for the given container the task is to be executed;

wherein a task sequence auditor supervises one or more of the following correct execution properties of a container:

non-execution of tasks, multiple execution of tasks, and incorrect sequence of task execution, and if any of these conditions is detected, the task sequence auditor reports an error.

* * * * *